United States Patent
Tachiiwa

(10) Patent No.: US 11,620,915 B2
(45) Date of Patent: Apr. 4, 2023

(54) FLIGHT DEVICE, FLIGHT SYSTEM, FLIGHT METHOD, AND PROGRAM

(71) Applicant: KDDI CORPORATION, Tokyo (JP)

(72) Inventor: Masayuki Tachiiwa, Tokyo (JP)

(73) Assignee: KDDI Corporation, Tokyo (JP)

(*) Notice: Subject to any disclaimer, the term of this patent is extended or adjusted under 35 U.S.C. 154(b) by 115 days.

(21) Appl. No.: 17/040,124

(22) PCT Filed: Feb. 28, 2019

(86) PCT No.: PCT/JP2019/007849
§ 371 (c)(1),
(2) Date: Sep. 22, 2020

(87) PCT Pub. No.: WO2019/187954
PCT Pub. Date: Oct. 3, 2019

(65) Prior Publication Data
US 2021/0056859 A1 Feb. 25, 2021

(30) Foreign Application Priority Data
Mar. 28, 2018 (JP) .............. JP2018-062973

(51) Int. Cl.
*G08G 5/04* (2006.01)
*G05D 1/10* (2006.01)
*G08G 5/00* (2006.01)

(52) U.S. Cl.
CPC .............. *G08G 5/04* (2013.01); *G05D 1/106* (2019.05); *G08G 5/0039* (2013.01)

(58) Field of Classification Search
CPC .......... G08G 5/04; G08G 5/0039; G05D 1/106
See application file for complete search history.

(56) References Cited

U.S. PATENT DOCUMENTS

| | | | | |
|---|---|---|---|---|
| 8,290,696 | B1* | 10/2012 | Sridhar | G08G 5/045 701/1 |
| 2014/0249738 | A1* | 9/2014 | Euteneuer | B62D 15/0265 701/301 |
| 2017/0045894 | A1* | 2/2017 | Canoy | G08G 5/0078 |

(Continued)

FOREIGN PATENT DOCUMENTS

| | | |
|---|---|---|
| JP | 2010-231698 A | 10/2010 |
| JP | 2012-113429 A | 6/2012 |

(Continued)

OTHER PUBLICATIONS

International Search Report issued in corresponding application No. PCT/JP2019/007849 dated Apr. 23, 2019 with English translation.

(Continued)

*Primary Examiner* — Hunter B Lonsberry
*Assistant Examiner* — Elizabeth Yang
(74) *Attorney, Agent, or Firm* — Foley & Lardner LLP

(57) ABSTRACT

A flight device configured to fly in an air includes an acquisition part configured to acquire a flight plan of the flight device; and a flight control part configured to change the flight plan during a flight along a flight route according to the flight plan for the flight device to circumvent a high-density area having a density of avoided objects equal to or above a threshold density in a first area located forward and downward from a position of the flight device.

10 Claims, 9 Drawing Sheets

(56) References Cited

U.S. PATENT DOCUMENTS

| | | | | |
|---|---|---|---|---|
| 2018/0068567 A1* | 3/2018 | Gong | ................... | G05D 1/106 |
| 2018/0275654 A1* | 9/2018 | Merz | ..................... | G08G 5/045 |
| 2019/0265705 A1* | 8/2019 | Zhang | ................... | G01C 21/20 |
| 2021/0074168 A1* | 3/2021 | Yamada | ............... | G08G 5/0026 |

FOREIGN PATENT DOCUMENTS

| | | | |
|---|---|---|---|
| JP | 2017-144986 A | 8/2017 | |
| JP | 2017-182691 A | 10/2017 | |
| JP | 2017-210156 A | 11/2017 | |
| WO | WO-2016/051526 A1 | 4/2016 | |
| WO | WO-2017/220130 A1 | 12/2017 | |

OTHER PUBLICATIONS

Office Action issued in Corresponding Japanese Application No. 2022-030700, dated Jun. 28, 2022.

* cited by examiner

| RANGE INFORMATION | DATE | TIME ZONE | IMAGE |
|---|---|---|---|
| ×× | 2018/1/1 | ALL DAY | CAPTURED IMAGE A |
| △△ | 2017/12/24 | 16 O' CLOCK ~ 23 O' CLOCK | CAPTURED IMAGE B |
| ... | ... | ... | ... |

FLIGHT DEVICE, FLIGHT SYSTEM, FLIGHT METHOD, AND PROGRAM

TECHNICAL FIELD

The present invention relates to a flight device configured to fly in the air, a flight system, a flight method, and a program.

The present application claims the benefit of priority on Japanese Patent Application No. 2018-62973 filed on Mar. 28, 2018, the subject matter of which is hereby incorporated herein by reference.

BACKGROUND ART

A technology for diminishing a chance of contact between a person and an unmanned aerial vehicle in a crash has been known. For example, Patent Document 1 discloses a method for controlling an unmanned aerial vehicle to fly outside an area upon detecting a person be present in the area possibly causing a crash of the unmanned aerial vehicle.

CITATION LIST

Patent Literature Document

Patent Document 1: Japanese Patent Application Publication No. 2017-144986

SUMMARY OF INVENTION

Technical Problem

According to the method disclosed by Patent Document 1, even when a single person be present in an area, an unmanned aerial vehicle is controlled to circumvent the area by flying outside the area. For this reason, despite a sufficiently low probability that an unmanned aerial vehicle might come into contact with any person in a crash, the unmanned aerial vehicle needs to repeatedly circumvent the area by flying outside the area. In result, it is necessary to address a problem about an unmanned aerial vehicle which needs to make a considerable detour before reaching its destination.

The present invention is made in consideration of the aforementioned circumstances and aims to provide a flight device, a flight system, a flight method, and a program which can reduce a flight time while diminishing the probability that a flight device may fall down to avoided objects.

Solution to Problem

In a first aspect of the present invention, a flight device configured to fly in the air includes an acquisition part configured to acquire a flight plan of the flight device, and a flight control part configured to change the flight plan, during a flight along a flight route according to the flight plan, to circumvent a high-density area having a density of avoided objects equal to or above a threshold density in a first area located forward and downward from the position of the flight device.

The flight device may further include a determination part configured to determine the density of avoided objects in the first area. When all the blocks in the first area have a density of avoided objects equal to or above the threshold density, the flight control part may change the flight route to pass through an area having a density of avoided objects less than the threshold density in a second area different from the first area.

The flight control part is configured to determine whether or not an avoided object is moving in the first area. Upon determining that the avoided object is moving in the first area, the flight control part may stop the flight device in a hovering state. When the density of avoided objects in the first area is changed to be less than the threshold density while the flight device stops in a hovering state, the flight control part may control the flight device to fly over the first area.

When the flight control part has repeatedly changed the flight plan a predetermined number of times in a predetermined period, the flight control part may request a flight management device configured to manage the flight plan to provide other flight plan different from the flight plan. When a flight altitude of the flight device is equal to or above a reference value, the flight control part may decrease the threshold density to be lower than a threshold density set to the flight device having its flight altitude less than the reference value.

The flight device may further include a detection part configured to detect an obstacle on the flight route. When the flight control part has changed the flight route to circumvent the obstacle detected by the detection part a predetermined number of times in a predetermined period, the flight control part may request a flight management device configured to manage the flight plan to provide other flight plan having a different flight route.

A second aspect of the present invention is directed to a flight management device configured to manage a plurality of flight devices, wherein the high-density area is registered as a congested place when each of the plurality of flight devices has changed the flight plan to circumvent the high-density area a predetermined number of times or more in a predetermined period.

The flight management device may further include a flight-plan generation part configured to generate a flight plan for the flight device to pass through a place not registered as the congested place. The flight management device may further include a display control part configured to display an image representing the congested place superposed on a map on a display screen, wherein upon selecting the congested place on the display screen, the display control part may display an image capturing the congested place on the display screen.

In a third aspect of the present invention, a flight method how to fly in the air may include the steps of: acquiring a flight plan; and changing the flight plan during a flight along a flight route according to the flight plan to circumvent a high-density area having a density of avoided objects equal to or above a threshold density in a first area located forward and downward from a flight position.

In a fourth aspect of the present invention, a program implementing the functions of: an acquisition part configured to acquire a flight plan of a flight device configured to fly in the air; and a flight control part configured to change the flight plan during a flight along a flight route according to the flight plan for the flight device to circumvent a high-density area having a density of avoided objects equal to or above a threshold density in a first area located forward and downward from the position of the flight device.

Advantageous Effects of Invention

According to the present invention, it is possible to produce an advantageous effect of reducing a flight time by diminishing the probability that a flight device may fall down to avoided objects.

DESCRIPTION OF EMBODIMENTS

[Outline of Flight System S]

Figure 1:
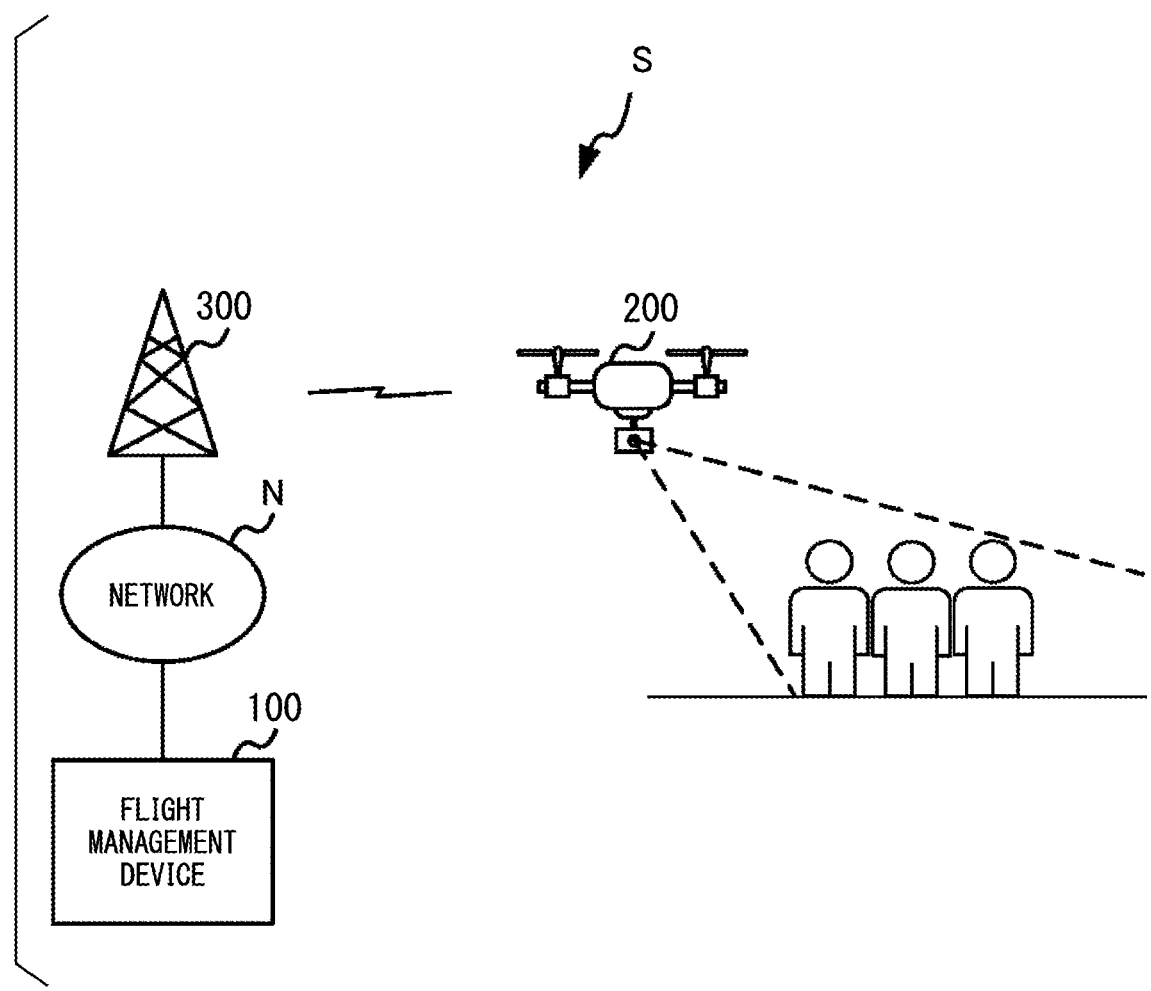
FIG. 1 is a schematic diagram showing the outline a flight system according to the present embodiment.

FIG. 1 is a schematic diagram showing the outline of a flight system according to the present embodiment. As shown in FIG. 1, the flight system S includes a flight management device 100 and a flight device 200. The flight management device 100 may be a server which is connected to the flight device 100 through a network N and a base station 300). For example, the network N may be a mobile-phone network such as an LTE.

The flight management device 100 is configured to produce a flight plan of the flight device 200 to fly in the air. The flight plan may include a flight route and a flight schedule. The flight route includes the information representing a departure position of the flight device 200 to start its flight, an arrival position of the flight device 200 to terminate its flight, and a pathway ranging from the departure position to the arrival position. The flight route may include the information for designating a flight altitude on a flight pathway. The flight schedule may include the information for designating a date/time of the flight device 200 to start its flight and a date/time of the flight device 200 to terminate its flight. For example, the flight management device 100 is configured to produce a flight route and a flight schedule based on the information input by a manager of the flight device 200.

The flight device 200 can be defined as a device which can fly in the air, e.g. a drone. The flight device 200 may acquire its flight plan from the flight management device 100 so as to fly along a flight route suggested by the flight plan. The flight device 200 is equipped with a camera configured to capture an image in a direction forward and downward its flight position. Dotted lines show an image-capture scope of the camera. The flight device 200 may determine a density of avoided objects in the image-capture scope of the camera. For example, avoided objects may be persons.

Figure 2A:
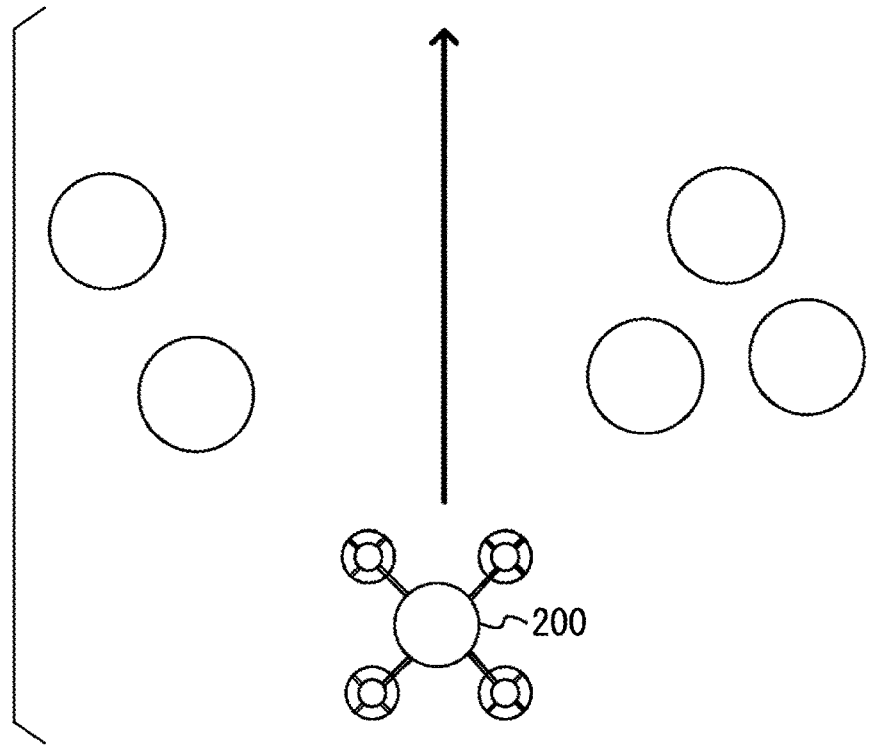
FIG. 2A is a diagrammatic view showing the state of a flight device of the present embodiment flying along a flight route having a low density of avoided objects from its upper view.
Figure 2B:
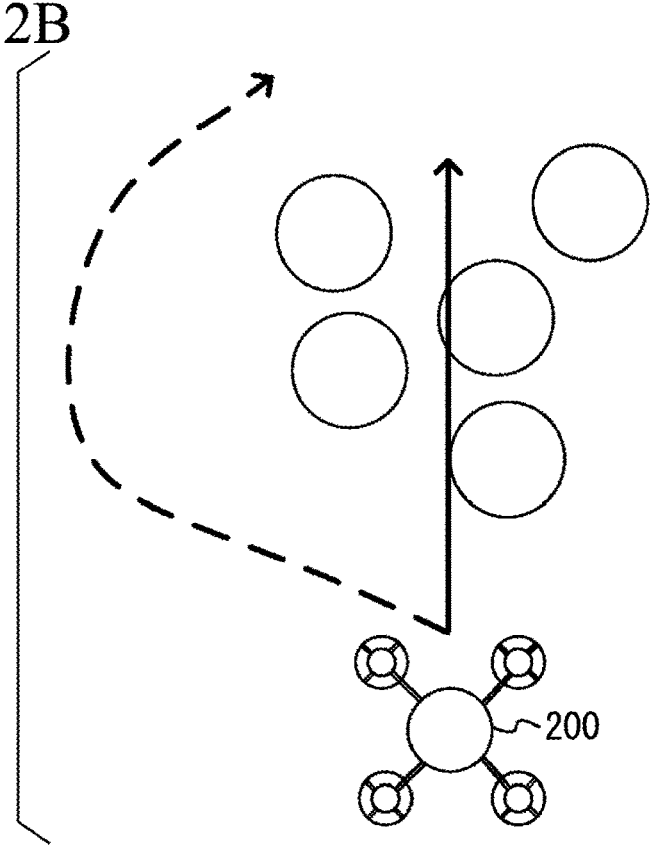
FIG. 2B is a diagrammatic view showing the state of a flight device of the present embodiment flying along a flight route having a high density of avoided objects from its upper view.

FIGS. 2A and 2B are diagrammatic views each showing the state of the flight device 200 flying in the air from its upper view. In FIGS. 2A and 2B, white circles show avoided objects. In FIGS. 2A and 2B, each of solid lines with arrows shows a flight route of the flight device 200.

FIG. 2A shows a density of avoided objects lower than a predetermined threshold of density just below the flight route of the flight device 200. FIG. 2B shows a density of avoided objects higher than the predetermined threshold of density just below the flight route of the flight device 200. The predetermined threshold of density means a value of density serving as the basis for determining whether or not to change the flight route. Details regarding the threshold of density will be described later.

As shown in FIG. 2A, the flight device 200 may move along the flight route when a density of avoided objects just below the flight route is lower than a predetermined threshold of density. As shown in FIG. 2B, when the density of avoided objects just below the flight route of the flight device 200 is equal to or above the predetermined threshold of density, the flight device 200 may determine an area having a density of avoided objects equal to or above the predetermined threshold of density as a high-density area. The flight device 200 may change it flight plan not to fly over avoided objects by changing its flight route as shown by dotted lines with an arrow.

According to the aforementioned configuration, it is possible to reduce the risk that the flight device 200 may come into contact with avoided objects in a crash or the risk that any falling objects from the flight device 200 may be brought into contact with avoided objects.

[Configuration of Flight Device 200]

Figure 3:
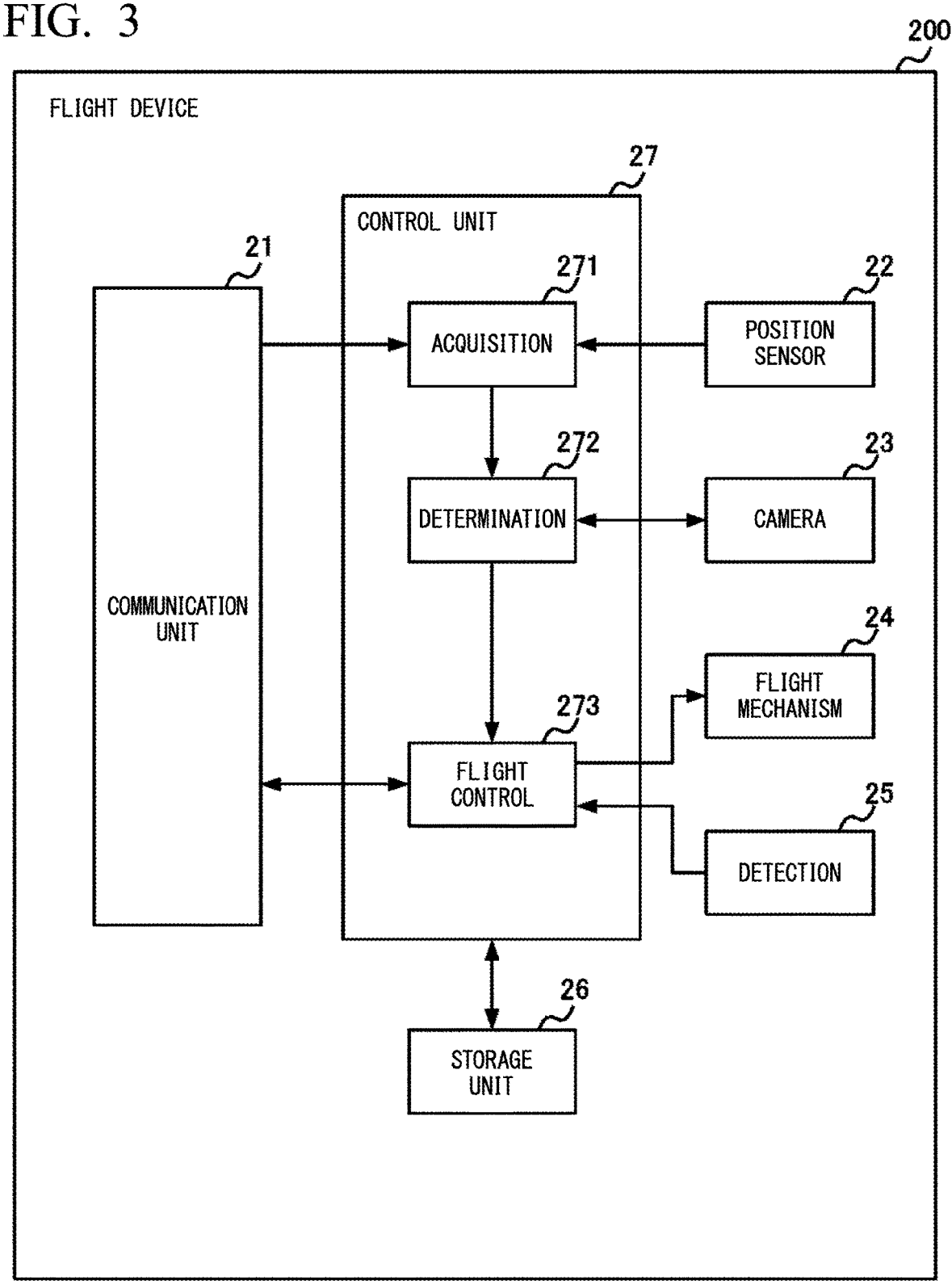
FIG. 3 is a block diagram showing the configuration of a flight device according to the present embodiment.

FIG. 3 is a block diagram showing the configuration of the flight device 200. The flight device 200 includes a communication unit 21, a position sensor 22, a camera 23, a flight mechanism 24, a detection part 25, a storage unit 26, and a control unit 27. The communication unit 21 is configured of a wireless-communication module to establish a communication with the flight management device 100 through a network N and a base station 300. The position sensor 22 is configured to acquire a flight position of the flight device 200. For example, the position sensor 22 may include a GPS receiver configured to receive GPS signals. The position sensor 22 may further include an altitude sensor configured to acquire the position of the flight device 200 flying in the air, including a flight altitude.

The camera 23 may capture images around a first area, which is extended forward and downward from the position of the fight device 200, in each predetermined period when the flight device 200 is flying along a flight route suggested by a flight plan. A manager of the flight device 200 may determine the predetermined period to reduce an oversight of avoided objects, for example, which is set to 0.1 seconds. The first area corresponds to an image-capturing scope in its entirety.

The flight mechanism 24 includes propellers, motors configured to rotate propellers, rudders, and the like. The flight mechanism 24 may operate those mechanics under the control of the control unit 27. The detection part 25 is configured to detect obstacles which may exist along the flight route. For example, obstacles may be trees grown over the flight route. For example, the detection part 25 may be a laser radar configured to detect obstacles upon receiving scattering light against laser beams.

The storage unit 26 is configured of storage media including ROM (Read-Only Memory), RAM (Random-Access Memory), or the like. The storage unit 26 stores programs to be executed by the control unit 27. The storage unit 26 is used as a work memory for the control unit 27. For example, the control unit 27 is a CPU (Central Processing Unit) configured to execute programs stored on the storage unit 26, thus achieving various functions such as an acquisition part 271, a determination part 272, and a flight control part 273.

In addition, the storage unit 26 is configured to store threshold densities. For example, the storage unit 26 may store different threshold densities associated with various types of conditions relating to flight conditions and circumferential environments of the flight device 200. For example, various types of conditions may be at least any one of the size or weight of the flight device 200, an altitude of the flight device 200 flying in the air, circumferential territories of the flight device 200, time zones, and weathers.

The acquisition part 271 is configured to acquire a flight plan including a flight route and a flight schedule from the flight management device 100 through the communication unit 21. The acquisition part 271 may acquire a flight plan including a plurality of flight routes. The acquisition part 271 notifies the determination part 272 of its acquired flight plan. In addition, the acquisition part 271 is configured to acquire a flight position of the flight device 200 from the position sensor 22. The flight position is used for a flight control of the flight device 20 to fly according to the flight plan.

In addition, the acquisition part 271 may acquire the flight-environment information including at least any one of a territory, a time zone, and weather. For example, the acquisition part 271 may transmit the flight position acquired from the position sensor 22 to an external device (not shown) configured to provide weather information. Accordingly, the acquisition part 271 may acquire from an external device the flight-environment information indicating the territory and/or the weather relating to the flight position of the flight device 200. Moreover, the acquisition part 271 may acquire the flight-environment information indicating a time zone checked by a clock mounted on the flight device 200.

[Determination of Density of Avoided Objects]

The determination part 272 is configured to determine a density of avoided objects be present in the first area located forward and downward from the position of the flight device 200 when flying along the flight route suggested by the flight schedule. A method how to determine a density of avoided objects with the determination part 272 will be described with reference to FIG. 4.

Figure 4:
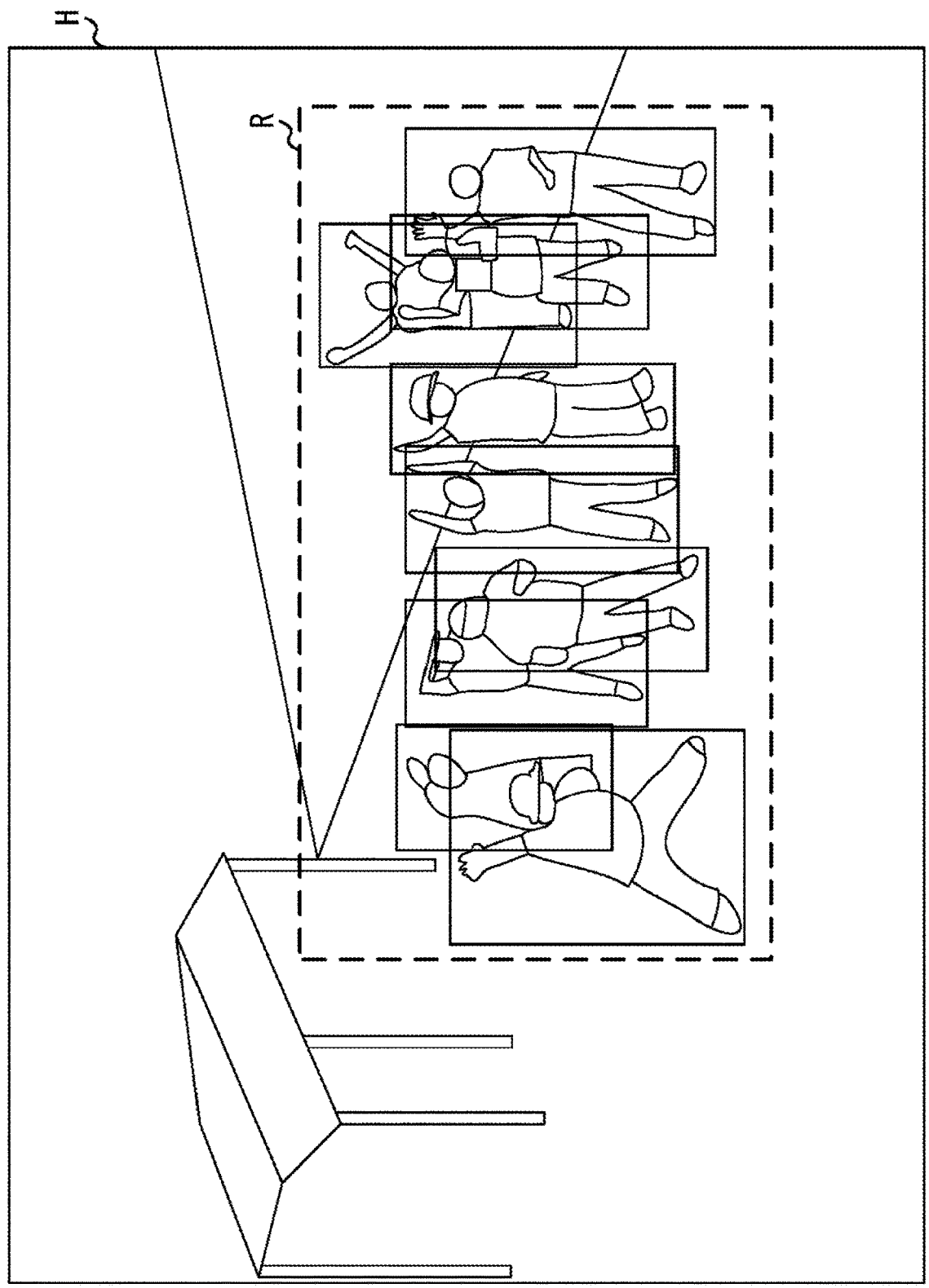
FIG. 4 is an illustration showing an example of image captured by a camera when a flight device of the present embodiment is flying in the air.

FIG. 4 shows an example of an image captured by the camera 23 when the flight device 200 is flying in the air. The determination part 272 recognizes a plurality of avoided objects be present in a first area H corresponding to the entirety of the captured image covered by an image-capturing scope of the camera 23. Solid-line frames show avoided objects recognized by the determination part 272.

The determination part 272 is configured to determine a distance to the ground using a unillustrated distance sensor. Since the directivity of the camera 23 has been determined in advance, the determination part 272 is able to calculate an area on the ground, which may be identical to an arbitrary range of the first area H, based on the calculated distance.

The determination part 272 divides the entirety of the first area H into a plurality of blocks and then divides the number of avoided objects included in each block by the area of each block among a plurality of blocks. Thus, the determination part 272 is able to determine a density of avoided objects for each block. Upon detecting avoided objects, the determination part 272 may select any one of avoided objects so as to count the number of other avoided objects located within a predetermined distance from the selected avoided object. The predetermined distance correlates to an area necessary to calculate the distribution of densities of avoided objects. Accordingly, the determination part 272 is able to determine the peripheral density of avoided objects with high accuracy while reducing the amount of calculations.

Returning back to FIG. 3, the flight control part 273 controls the flight mechanism 24 to control the flight device 200 in terms of the flying direction, altitude, and speed. The flight control part 27 successively transmit to the flight management device 100 through the communication unit 21 an image captured by the camera 23, the position information representing a flight position of the flight device 200, and a battery level when the flight device 200 is flying in the air.

[Method to Circumvent High-Density Area R]

The flight control part 273 is configured to compare the density of avoided objects in the first area H, which is determined by the determination part 272, with a threshold density stored on the storage unit 26. Through the comparison, the flight control part 273 is configured to determine whether or not to change the flight route through comparison. The flight control part 273 is configured to control the flight direction based on the determination result. Specifically, the flight control part 273 may control the flight device 200 to fly in the air by changing the flight plan to circumvent the high-density area R having a density of avoided objects equal to or above the threshold density read from the storage unit 26.

The flight control part 273 is configured to determine whether or not the flight route suggested by the flight plan acquired by the acquisition part 271 may pass over the high-density area R. Upon determining that the flight route suggested by the flight plan passes over the high-density area R, the flight control part 273 may change the flight plan to circumvent the high-density area R when the flight device 200 flies in the air. Upon determining that the flight route suggested by the flight plan does not pass over the high-density area R, the flight control part 273 controls the flight device 200 to fly along the flight route.

Figure 5:
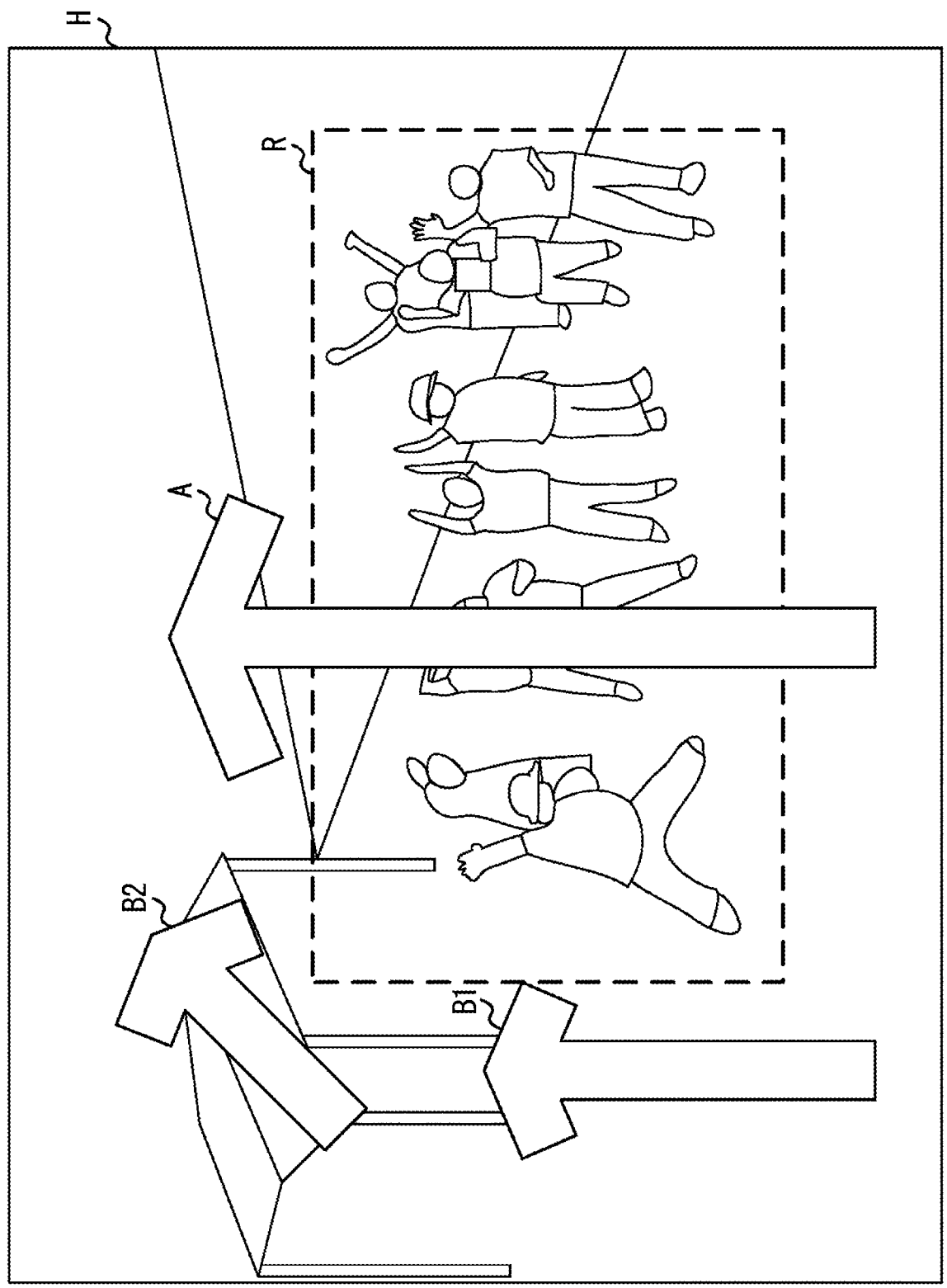
FIG. 5 is an illustration for explaining a process to change a flight plan with a flight control part of the present embodiment.

A method of changing the flight plan with the flight control part 273 will be described with reference to FIG. 5. In FIG. 5, an arrow A shows the flight route suggested by the flight plan acquired by the acquisition part 271. The acquisition part 271 acquires the flight plan which may suggest the flight route passing over the high-density area R determined by the determination part 272.

When the flight route posses over the high-density area R, the flight control part 273 may change the flight route to circumvent an upper space above the high-density area R. The flight control part 273 changes the flight route as shown by arrows B1, B2. The changed flight route of the flight control part 273 may circumvent an upper space above the high-density area R. That is, the changed flight route may pass over a low-density area having a lower density of avoided objects than the density determined by the determination part 272. After circumventing the upper space above the high-density area R, the flight control part 273 may restore its original flight route before changing. In this connection, the flight control part 273 may generate sound notifying walkers of an event that the flight device 200 is going to fly over walkers using a speaker, thus requesting walkers to move outside the flight route.

Upon determining that all the blocks of the first area H have a density of avoided objects above the threshold density, the flight control part 273 determines whether or not any low-density area having a density of avoided objects less than the threshold density may be found in a second area different from the first area H. For example, the second area may adjoin the first area H on its right side or its left side. The flight control part 273 instructs the determination part 272 to determine a density of avoided objects in the second area. That is, when all blocks of the first area H have a density of avoided objects equal to or above the threshold density, the determination part 272 determines a density of avoided objects in the second area. Accordingly, it is possible to determine the existence of a low-density area in the second area based on a density of avoided objects which the determination part 272 may determine using an image of the second area to be captured by changing the directivity of a camera. Upon determining the existence of a low-density area in the second area, the flight control part 273 may change the flight route to pass over the low-density area. According to the aforementioned configuration, even when all the blocks of the first area H are determined as high-density areas, the flight control part 273 can reduce the risk that the flight device 200 or its associated parts may come into contact with any avoided objects in a crash.

Upon determining the nonexistence of a low-density area having a density of avoided objects less than the threshold density in the second area, the flight control part 273 may determine whether or not a low-density area having a density of avoided objects less than the threshold density is found in a third area different from the first area H and the second area. Upon determining the existence of a low-density area having a density of avoided objects less than the threshold density in the third area, the flight control part 273 may change the flight route to pass over the low-density area.

Occasionally, some avoided objects found in the high-density area R may move in a desired direction. In this case, it is necessary to consider the possibility that the flight device 200 would be controlled to move in the same direction as the moving direction of avoided objects so as to circumvent the high-density area R. However, this may prevent the flight device 200 from circumventing the upper space over the high-density area R. For this reason, the flight device 200 may move in a reverse direction to the moving direction of avoided objects so as to circumvent the high-density area R.

Specifically, the flight control part 273 determines the moving direction of avoided objects, the number of which is equal to or above a predetermined number, among a plurality of avoided objects found in the high-density area of the first area H, and therefore the flight control part 273 may set a second area located in a reverse direction to the moving direction of avoided objects. Among a plurality of avoided objects found in the high-density area of the first area H, when five persons or more are moving in a right direction, for example, the flight control part 273 may set a second area located in a left direction from the first area H. In this connection, the flight control part 273 may determine a moving direction of avoided objects, the ratio of which is equal to or above a predetermined ratio among a plurality of avoided objects found in the high-density area of the first area H. For example, the predetermined ratio is a half the number of avoided objects in the high-density area. The flight control part 273 determines whether or not a low-density area is found in the second area.

[Method of Determining Threshold Density by Flight Device]

The flight control part 273 acquires the threshold density determined by the flight management device 100 through the communication unit 11. The flight control part 273 transmits to the flight management device 100 the position information representing the flight position, the flight-device information (e.g. a battery level and speed), and the weather information as the information used to determine the threshold density. The weather information includes wind speed, rainfall, and temperature. The method how to generate the threshold density with the flight management device 100 will be described later. The flight control part 273 updates the threshold density stored on the storage unit 26 using the acquired threshold density.

In addition, the storage unit 26 may store a plurality of threshold densities in association with various types of conditions, and therefore the flight control part 273 may select a usable threshold density, from among a plurality of threshold densities stored on the storage unit 26 in association with various types of conditions, according to the state of the flight device 200. When the size or weight of the flight device 200 is equal to or above a reference value, for example, it is possible to select a smaller threshold density than a threshold density to be selected when the size or weight of the flight device 200 is less than the reference value. A manager of the flight device 200 may determine in advance the reference value depending on the degree of damage which would be predicted to occur when the flight device 200 or its associated parts may come in contact with any avoided objects. The flight control part 273 reads the size or weight of the flight device 200 from the storage unit 26. The flight control part 273 selects a threshold density according to the size or weight of the flight device 200. The flight control part 273 may measure a deadweight with an unillustrated sensor so as to calculate the total weight by summing up the deadweight and the tare weight of the flight device 200.

When the flight device 200 measures its size as fifty-centimeter long in each of four sides or its total weight of one kilogram, for example, the flight control part 273 determines a threshold density as many as nine persons for an area of ten square-meters. When the flight device 200 measures its size as one-meter long in each of four sides or its total weight of thirty kilograms, the flight control part 273 determines a threshold density as many as three persons for an area of ten square-meters.

According to the aforementioned configuration, it is possible for the flight control part 273 to repress big damages occurring when the flight device 200 having a relatively large size or a relatively heavy weight comes in contact with any avoided objects.

The flight control pan 273 may determine the threshold density based on a flight altitude of the flight device 200. In this case, an altitude sensor provided as part of the position sensor 22 is used to acquire a flight altitude of the flight device 200. The flight control part 273 determines whether or not the acquired flight altitude is equal to or above a reference value.

When the flight altitude of the flight device 200 is equal to or above the reference value, the flight control part 273 reduces the threshold density to be smaller than a threshold density selected when the flight altitude is less than the reference value. The skilled person in the art may determine the reference value depending on the degree of damage which would be predicted when the flight device 200 may come in contact with any avoided objects in a crash. According to the aforementioned configuration, it is possible for the flight control part 273 to repress big damages occurring when the flight device 200 may fall down from a relatively high flight position and come into contact with any avoided objects in a crash.

The flight control part 273 may determine the threshold density based on at least any one of a territory, a time zone, and weather included in the flight-environment information acquired by the acquisition part 271. For example, the flight control part 273 reads the threshold density which is stored on the storage unit 26 in association with the flight-environment information.

A density of avoided objects may be changed according to a territory, a time zone, or weather when the flight device 200 flies in the air. For example, a density of avoided objects may tend to be normally higher in an urban area providing a relatively small number of options relating to avoidable routes. Therefore, an excessively low density of avoided objects may banish flyable routes for the flight device 200. For this reason, the flight control part 273 needs to prevent the high-density area R subjected to circumvention from be excessively expanded using the threshold density depending on a flight territory, a time zone, and weather. In other words, it is possible for the flight control part 273 to repress the fear that the flight device 200 may not fly over the high-density area R.

Using a threshold density depending on a flight territory, a time zone, and weather, it is possible for the flight control part 273 to prevent the high-density area R subjected to circumvention from be excessively narrowed. Therefore, it is possible for the flight control part 273 to repress a reduction of an advantageous effect of reducing the risk that the flight device 200 may come in contact with any avoided objects in a crash due to a reduction of a frequency of circumventing the high-density area R.

The flight control part 273 may determine the threshold density based on the subscription information as to whether or not the flight device 200 subscribes life insurance or damage insurance. For example, the flight control part 273 may decrease a threshold density relating to the Right device 200 not subscribing life insurance or damage insurance to be lower than a threshold density relating to the flight device 200 subscribing life insurance or damage insurance. For example, the flight control part 273 may determine a threshold density based on the subscription information which the acquisition part 271 acquires from the flight management device 100 or the storage unit 26.

When the flight device 200 comes in contact with any avoided objects in a crash on the condition that the flight device 200 does not subscribe life insurance or damage insurance, a user of the flight device 200 may reimburse payment for damages excessively. For this reason, the present embodiment is designed to reduce the risk that the user may pay an excessive amount of reimbursement by decreasing the threshold density when the flight device 200 does not have life insurance or damage insurance.

[Hovering on Standby]

The flight control pan 273 may be hovering on standby without changing the flight route upon determining the possibility that the high-density area R will disappear from the flight route irrespective of determining that the flight route passes over the high-density area R in the first area H.

For example, the flight control part 273 determines whether or not any avoided objects are moving in the high-density area R of the first area H, and therefore the flight device 200 may stop its movement in a hovering state when the flight control part 273 determines that some avoided objects are moving in the high-density area R of the first area H. The flight control part 273 may determine that the flight device 200 can stop its movement in a hovering state on the condition that the flight device can reach its destination by a predetermined time with reference to the flight schedule even when the flight device 200 stops movement for a predicted time needed for avoided objects to leave from the flight route. In this connection, the flight control part 273 does not need to perfectly stop the movement of the flight device 200 in a hovering state, wherein the flight control part 273 may decrease the flight speed of the flight device 200 in a hovering state to be lower than a previous flight speed before the flight device 200 starts hovering in the air.

It is possible for a person or a vehicle serving as an avoided object to clearly hear the sound produced by rotating propellers of the flight device 200, the avoided object may leave from the flight device 200 when stopped in a hovering state. For this reason, the flight control part 273 may determine whether or not the density of avoided objects in the first area H determined by the determination part 272 will be changed to be lower than the threshold density when the flight device 200 stops in a hovering state.

When the density of avoided objects in the first area H is changed to be lower than the threshold density on the condition that the flight device 200 stops in a hovering state, the flight control part 273 controls the flight device 200 to fly over the first area H along the flight route acquired by the acquisition part 271. This is because it is possible to foresee a low possibility that the flight device 200 would come in contact with any avoided objects in a crash when the high-density area R just below the flight route is changed to a low-density area. Therefore, it is possible for the flight control part 273 to control the flight device 2M to fly along the flight route.

The flight control part 273 may change the flight plan to circumvent the high-density area R determined by the determination part 272 upon determining that the density of avoided objects just below the flight route is maintained to be equal to or above the threshold density and has not be changed after the lapse of a predetermined time from the timing at which the flight device 200 stops its movement in a hovering state. For example, the predetermined time may be set to an enough time for the flight device 200 to reach its destination on an arrival time.

Upon determining the nonexistence of a low-density area in the second area, the flight control part 273 may control the flight device 200 to stop in a hovering state until the flight control part 273 determines the existence of a low-density area in either the first area H or the second area. The flight control part 273 may change the flight route for the flight device 200 to pass through a low-density area upon determining the existence of the low-density area in either the first area H or the second area after the flight device 200 stops in a hovering state.

[Request of Other Flight Plan]

The flight control part 273 may request another flight plan having a different flight route with the flight management device 100 configured to manage flight plans after changing flight plans to circumvent high-density areas determined by the determination part a predetermined number of times or more in a predetermined period. As the predetermined period and the predetermined number of times, a skilled person in the art may determine reference values which would assume the occurrence of failures in the flight device 200 flying in the air when flight plans have been continuously changed at the same frequency. For example, the predetermined period and the predetermined number of times may be set to reference values which would assume a battery-level shortage of the flight device 200 or an incapacity of the flight device 200 to reach its destination at the designated time when flight plans have been continuously changed at the same frequency.

Repeatedly changing flight plans with the flight control part 273 would develop the possibility that the flight device 200 might have flown over the congested place in which numerous high-density areas are densely clustered together. For example, the congested area may be located around fireworks-display sites or open-space baseball fields. To bypass the congested place, the flight control part 273 transmits to the flight management device 100 the request information requesting a change into another flight plan having a different flight route.

As the response information responding to the request information transmitted to the flight management device 100, the flight control part 273 acquires another flight plan having a different flight route from the flight management device 100. The flight control part 273 controls the flight device 200 to fly along the flight route set to the acquired flight plan.

When the acquisition part 271 acquires a flight plan including a plurality of flight routes, the light control part 273 may control the flight device 200 to fly along a first flight route having a highest priority among a plurality of flight routes set to the flight plan. Upon determining that the first flight route passes over the high-density area R, the flight control part 273 may change its flight route with a second flight route along which the flight device 200 can fly in the air among a plurality of flight routes. In this connection, the second flight route is set to circumvent the upper space above the high-density area R but to pass over a low-density area.

When the detection part 25 detects an obstacle on the flight route, the flight control part 273 may change the flight route, which is set to the flight plan acquired by the acquisition part 271, to circumvent the obstacle. In this case, after repeatedly changing flight routes a predetermined number of times or more in a predetermined period in order to circumvent the obstacle detected by the detection part 25, the flight control part 273 may request the flight management device 100, which configured to manage flight plans, to change its flight plan to another flight plan having a different flight route.

After circumventing the high-density area R or an obstacle on the flight route, the flight control part 273 measures the position of the high-density area R or the like. For example, the flight control part 273 may measure the position of the high-density area R or the like based on the detection result of the detection part 25 in association with the position sensor 22, a direction sensor (not shown), or a distance sensor mounted on the flight device 200. In this case, the flight control part 243 transits to the flight management device 100 the information representing the measured position of the high-density area R or the like.

[Configuration of Flight Management Device 100]

Figure 6:
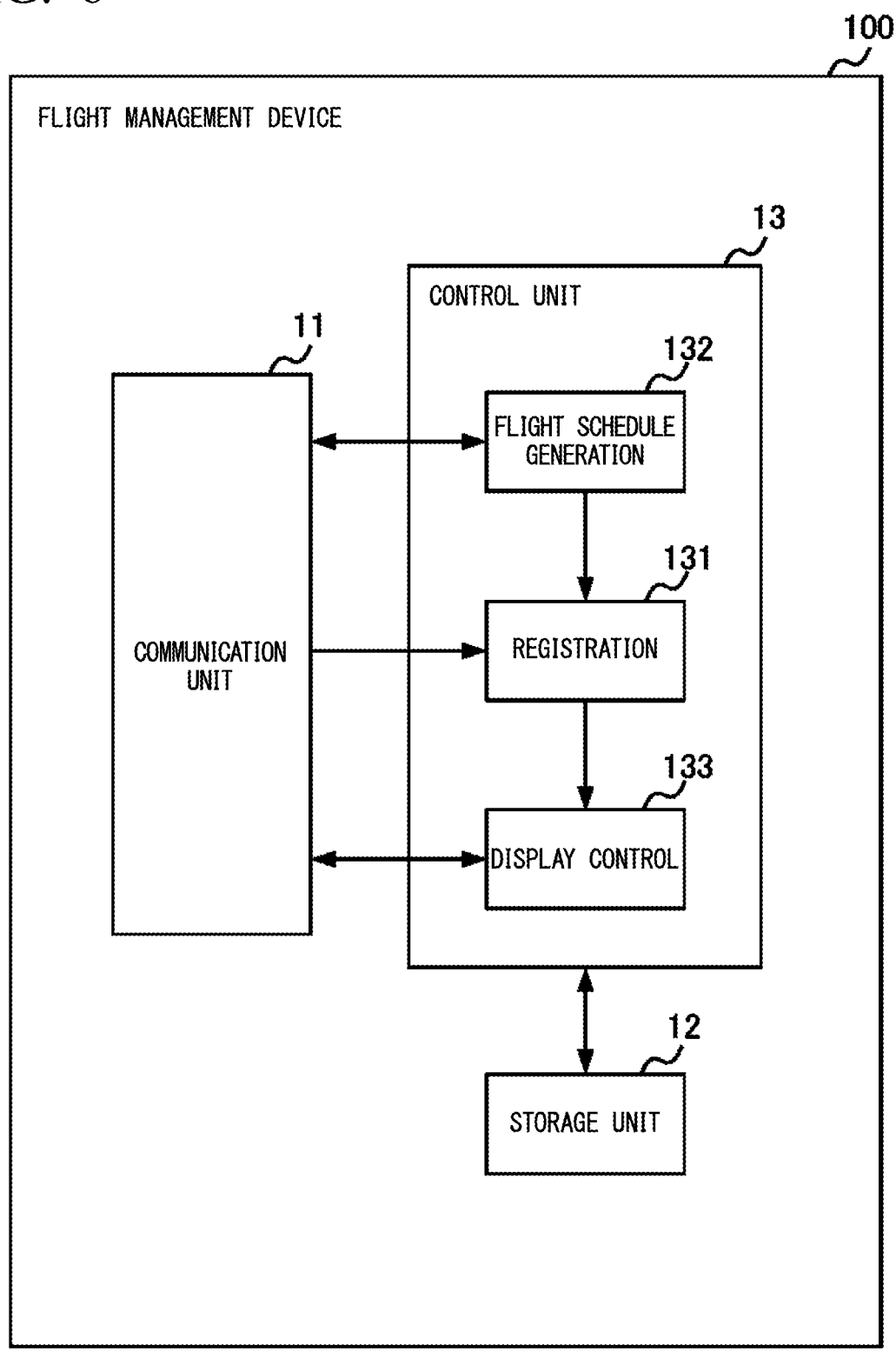
FIG. 6 is a block diagram showing the configuration of a flight management device of the present embodiment.

FIG. 6 is a block diagram showing the configuration of the flight management device 100. The flight management device 100 includes a communication unit 11, a storage unit 12, and a control unit 13. The communication unit 11 is an interface configured to communicate with the flight device 200 through the network N via the base station 300. The storage unit 12 is configured of storage media including ROM (Read-Only Memory), RAM (Random-Access Memory), and the like. The storage unit 12 is configured to store programs to be executed by the control unit 13. In addition, the storage unit 12 may be used as a work memory for the control unit 13. For example, the control unit 13 is a CPU (Central Processing Unit) configured to execute programs stored on the storage unit 12, thus realizing functions as a registration part 131, a flight-plan generation part 132, and a display control part 133.

The registration part 131 is configured to register congested places set by a manager with the storage unit 12. In addition, the registration parts 131 may predict congested places based on the event information such as an event of making a year's first visit to the shrine, thus registering the predicted congested places, their dates, and time zones with the storage unit 12. The registration part 131 is configured to acquire the event information from an external device. Alternatively, a manager may input the event information to the flight management device 100.

The registration part 131 may register congested places with the storage unit 12 based on the history information, i.e. a history regarding the number of terminals concurrently connectible to the base station 300. For example, upon acquiring from an external device (not shown) the history information indicating the number of terminals concurrently connected to the base station 300 exceeds a threshold value, the registration part 131 may register the cell of the base station 30 as a range of congested places. At this time, the registration part 131 may register the date and the time zone in which the number of terminals concurrently connected to the base station 300 exceeds the threshold value as the date and the time zone for each congested place. When a plurality of flight devices 200 have repeatedly changed their flight plans to circumvent high-density areas a predetermined number of times in a predetermined period, the registration part 131 may register high-density areas as congested places. When the flight device 200 circumvents the high-density area R, the registration part 131 may acquire the high-density-area information representing the position of the high-density area R from the flight device 200. The registration part 131 may register a distributed range of high-density areas R as a congested place upon acquiring from a plurality of flight devices 200 the high-density-area information representing positions within a predetermined range as positions of high-density areas R a predetermined number of times or more in a predetermined period. In this connection, a skilled person in the art may determine the predetermined range having a numeric value representing the same or associated high-density area R. For example, the predetermined period and the predetermined number of times may be each set to a significantly-high value in statics as a frequency of acquiring the high-density-area information.

Figures 7, 8:
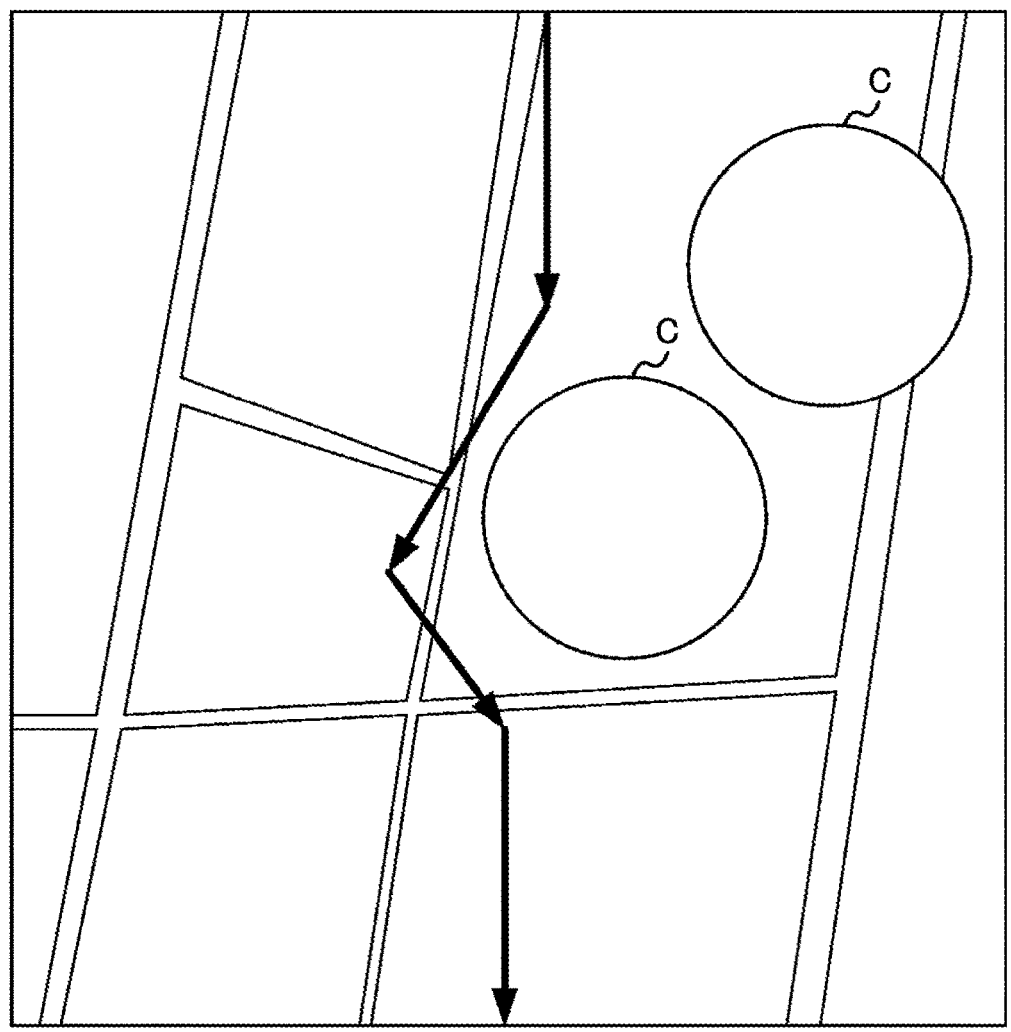
FIG. 7 shows an example of a table for registering congested places with a registration part of the present embodiment.
FIG. 8 is a schematic diagram showing an example of a map image according to the present embodiment.

FIG. 7 shows an example of congested places registered with the registration part 131. The registration part 131 is configured to store the range information representing a range of congested places subjected to registration, the date and the time zone when acquiring the high-density-area information corresponding to each congested place from the flight device 200, and an image capturing the congested place with the camera 23 of the flight device 200 in association with each other.

In an example of FIG. 7, the registration part 131 registers with the storage unit 26 "xx" representing the range of a congested place, Jan. 1, 2018 representing the date when acquiring the high-density-area information corresponding to the congested place, "all day" as the time zone when acquiring the high-density-area information corresponding to the congested place, and a captured image A capturing the congested place in association with each other. For example, the range "xx" indicates the information representative of arrange of latitudes and longitudes. The time zone "all day" indicates that the registration part 131 has acquired from the flight device 200 the high-density-area information corresponding to the congested place all day. For example, the captured image A is a captured image of a person whose face is processed using a mosaic pattern for privacy protection.

In addition, the registration part 131 registers with the storage unit 26 "ΔΔ" representing the range of a congested place, Dec. 24, 2017 as the date when acquiring the high-density-area information corresponding to the congested place, "16 o'clock-23 o'clock" representing the time zone when acquiring the high-density-area information corresponding to the congested place, and a captured image B capturing the congested place in association with each other. For example, "ΔΔ" indicates the information representative of a range of latitudes and longitudes. The time zone "16 o'clock-23 o'clock" indicates that the registration part 131 has acquired the high-density-area information corresponding to the congested place during 16 o'clock through 23 o'clock. Similar to the captured image A, the captured image B is a captured image of a person whose face is processed using a mosaic pattern.

The registration part 131 may erase the registered information as the congested place from the storage unit 26 after the lapse of a registration-erasure period. The registration-erasure period is a predicted time needed to eliminate congestion, e.g. one day. Upon repeatedly acquiring from a plurality of flight devices 200 the high-density-area information representing a range of positions registered as congested places a predetermined number of times or more in a predetermined period before the lapse of the registration-erasure period, the registration part 131 may indefinitely maintain the registered information as the congested place without erasing the registered information from the storage unit 26. For example, the predetermined number of times in the predetermined period may be set to a significantly-high value in statics as a frequency of acquiring the information representing the position of the high-density area R.

The flight-plan generation part 132 is configured to generate a flight plan for the flight device 200 to fly in the air. The flight-plan generation part 132 may generate a flight route and a flight schedule included in the flight plan. The flight-plan generation part 132 may generate a flight route for the flight device 200 to pass through a certain place not registered as the congested place with the storage unit 26. For example, the flight-plan generation part 132 may generate a flight plan for the flight device 200 to fly a predetermined distance or more apart from a range of congested places registered with the storage unit 26. When the flight device 200 is equipped with a GPS receiver as the position sensor 22, the predetermined distance would be a larger value than an error of GMS measurements. According to the aforementioned configuration, the flight-plan generation part 132 is able to generate a flight route having the flight device 200 not passed through congested places.

In addition, it is possible to register the information representing the position of an obstacle with the storage unit 26. The flight-plan generation part 132 may generate a flight route for the flight device 200 to pass through a certain place not registered as the position of an obstacle with the storage unit 26. In this connection, the flight-plan generation part 132 may generate a flight plan including a plurality of flight routes.

Upon receiving from the flight device 200 the request information requesting another flight plan having a different flight route, the flight-plan generation part 132 may generate a new flight route. The flight-plan generation part 132 acquires from the flight device 200 the information representing a high-density area or the position of an obstacle which the flight device 200 has circumvented. The flight-plan generation part 132 may generate a flight route for the flight device 200 not to pass through the acquired high-density area or the acquired position of an obstacle as well as a congested place and the position of an obstacle registered with the storage unit 26. The flight-plan generation part 132 generates and transmits the new flight plan having the flight route to the flight device 20 requesting another flight plan. When the flight device 200 is set to the flight route to pass over avoided objects, the flight-plan generation part 132 may notify a predetermined contact address of the flight route to pass over avoided objects in advance irrespective of a density of avoided objects. For example, the predetermined contact address may be an administrative agency configured to exercise jurisdiction over flights of flight devices 200.

[Method of Determining Threshold Density with Flight Management Device]

The flight-plan generation part 132 is configured to determine a threshold density as the basis for determining whether or not to change flight routes. As the information for determining a threshold density, the flight-plan generation part 132 may acquires the position information indicating a flight position and the flight-device information (e.g. a battery level or speed) as well as the weather information (e.g. wind speed, rainfall, temperature) from the flight device 200.

The flight-plan generation part 132 is configured to calculate a flight appropriateness considering a crash risk according to all the conditions (1)-(9) or a combination of multiple conditions as follows.
(1) A flight distance from a departure point to a destination point.
(2) A territory which a flight route may pass through.
(3) A time zone.
(4) Weather information acquired from the flight device 200.
(5) Specification of the flight device 200 such as the size, weight, maximum speed, maximum wind-pressure resistance.
(6) A precondition as to whether or not the flight device 200 subscribes life insurance or damage insurance.
(7) The existence/nonexistence of other flight device in a flight-schedule time.
(8) A possibility of causing a battery-level shortage during flight.
(9) An arrival-schedule time at a destination point.

The flight appropriateness may serve as a parameter for determining a threshold value of flight using a combination of conditions, wherein a larger value of the flight appropriateness indicates a higher safety to be assured during a flight of the flight device 200. The flight-plan generation part 132 may determine the flight appropriateness with respect to each of the above conditions as follows.

[(1) Flight Distance from Departure Point to Destination Point]

Compared to a short flight distance, a long light distance from a departure point to a destination point may cause a relatively high crash risk of the flight device 200 or a relatively high risk that objects would be fallen down from the flight device 200. When the flight device is equal to or above a predetermined value, the flight-plan generation part 132 may subtract a certain score from the flight appropriateness stored on the storage unit 12. For example, the predetermined value is a half the maximum flight distance of the flight device 200. When the flight distance is less than the predetermined value, the flight-plan generation part 132 does not subtract a certain score from the flight appropriateness stored on the storage unit 12.

[(2) Territory which Flight Route Passes Through]

A territory having a high population density may easily cause a dense congestion of avoided objects. When a low threshold density is set to the territory, it becomes difficult for the flight-plan generation part 132 to set a flight route. For this reason, when the flight device 200 is going to fly over a territory having a population density equal to or above a reference value, the flight-plan generation part 132 may add a certain score to the flight appropriateness stored on the storage unit 12. For example, the reference value may come from statics of population densities in urban areas of multiple cabinet-ordered cities. When the flight device 200 is going to fly over a territory having a population density less than the reference value, the flight-plan generation part 132 does not add a certain score to the flight appropriateness stored on the storage unit 12.

[(3) Time Zone]

In the same territory, however, a tendency of causing a dense congestion of avoided objects may be varied according to time zones. For example, a dense congestion of avoided objects may easily occur in business districts in time zones of commutation. A territory and a time zone of congestion which tends to cause a dense congestion of avoided objects are stored on the storage unit 12 in association with each other. When a time zone of congestion, which is stored on the storage unit 12 in association with a territory covering a flight of the flight device 200, matches a time zone allotted to a flight of the flight device 200, the flight-plan generation part 132 may add a certain score to the flight appropriateness stored on the storage unit 12. On the other hand, when the time zone of congestion does not match the time zone allotted to a flight of the flight device 200, the flight-plan generation part 132 does not add a certain score to the flight appropriateness stored on the storage unit 12.

[(4) Weather Information]

Compared to the good weather, the bad weather for the flight device 200 to fly in the air may cause a high crash risk of the flight device 200 or a high risk that objects would be fallen down from the flight device 200. When the weather information acquired from the flight device 200 indicates wind speed or rainfall equal to or above a reference value or when the weather information indicates temperature equal to or above reference temperature, the flight-plan generation part 132 may subtract a certain score from the flight appropriateness stored on the storage unit 12. For example, the reference value relating to wind speed or rainfall may be set to a half of an upper-limit value of wind speed or rainfall which is determined according to standards of the flight device 200. The reference temperature may be set to a higher value than a lower-limit value of the operating temperature determined according to standards of the flight device 200, e.g. zero-degrees Celsius.

[(5) Specification of Flight Device 200]

When the specification of the flight device 200 includes the size or weight of the flight device 200 equal to or above a reference value, the flight-plan generation part 132 may subtract a certain score from the flight appropriateness stored on the storage unit 12. A manager of the flight device has determined in advance the reference value according to a predicted degree of damage to occur in a crash when the flight device comes in contact with any avoided objects. On the other hand, when the size or weight of the flight device 200 is less than the reference value, the flight-plan generation part 132 does not subtract a certain score from the flight appropriateness stored on the storage unit 12.

When the specification of the flight device 200 includes a relatively high value with respect to the maximum wind pressure resistance or the maximum battery capacity, the flight device 200 may have a high degree of flight stability, and therefore it is possible to assume a relatively low crash risk of the flight device 200 or a relatively low risk that objects would be fallen down from the flight device 200. When the specification of the flight device 200 includes the maximum wind pressure resistance or the maximum battery capacity equal to or above a reference value, the flight-plan generation part 132 may add a certain score to the flight appropriateness stored on the storage unit 12.

For example, the reference value of the maximum wind pressure resistance is set to an appropriate value which may allow the flight device 20 to fly in its territory under its normally-occurred wind pressure. For example, the reference value of the maximum battery capacity is set to an appropriate value which may allow the flight device 200 to fly in a double flight distance or more. When the specification of the flight device 200 includes the maximum wind pressure resistance or the maximum battery capacity less than the reference value, the flight-plan generation part 132 does not add a certain store to the flight appropriateness stored on the storage unit 12.

[(6) Life Insurance or Damage Insurance]

As described above, when the flight device 200 does not have life insurance or damage insurance, it is concerned with the fear that a user of the flight device 200 might pay an excessive amount of reimbursement for damages in a crash of the flight device 200 which may come into contact with any avoided objects. When the flight device 200 does not subscribe life insurance or damage insurance, the flight-plan generation part 132 may subtract a certain score from the flight appropriateness stored on the storage unit 12. On the other hand, the flight device 200 subscribes life insurance or damage insurance, the flight-plan generation part 132 may not subtract a certain score from the flight appropriateness stored on the storage unit 12.

[(7) Existence/Nonexistence of Other Flight Device]

A schedule to fly another flight device 200 than the flight device 200 during its flight may cause a risk of generating conflict between those flight devices 200. For this reason, when the storage unit 12 has stored a flight plan indicating a schedule to fly another flight device 200 than the flight device 200 during its flight, the flight-plan generation part 132 may subtract a certain score from the flight appropriateness stored on the storage unit 12. On the other hand, when the storage unit 12 does not store a flight plan indicating a schedule to fly another flight device 200 than the flight device 200 during its flight, the flight-plan generation part 132 may not subtract a certain score from the flight appropriateness stored on the storage unit 12.

[(8) Battery Level]

Due to lack of a battery-level allowance, the flight device 200 may face the possibility of a battery-level shortage which may occur when a flight distance is increased to circumvent a high-density area. For this reason, based on the battery level included in the flight-device information acquired from the flight device 200, the flight-plan generation part 132 determines whether or not the battery level becomes equal to or below a predetermined value when the flight device 200 will fly along the flight route. When the battery level becomes equal to or below the predetermined value when the flight device 200 will fly along the flight route, the flight-plan generation part 132 adds a certain score to the flight appropriateness stored on the storage unit 12. For example, the predetermined time may be set to one thirds of the maximum battery capacity of the flight device 200. On the other hand, when the battery level is maintained above the predetermined value even when the flight device 200 flies along the flight route, the flight-plan generation part 132 does not add a certain score to the flight appropriateness stored on the storage unit 12.

[(9) Due Time of Arrival at Destination]

When a relatively short time remains before an arrival deadline to reach a destination, it may be impossible for the flight device 200 to reach the destination by the arrival deadline due to an increased flight time when circumventing a high-density area. For this reason, based on the position information acquired from the flight device 200, the flight-plan generation part 132 determines whether or not the flight device 200 can reach the destination a predetermined time or more before the deadline of arrival when flying along the flight route. For example, the predetermined time may be set to ten minutes. Upon determining that the flight device 200 fails to reach the destination the predetermined time or more before the arrival deadline when flying along the flight route, the flight-plan generation part 132 subtracts a certain score from the flight appropriateness stored on the storage unit 12. On the other hand, upon determining that the flight device 200 will reach the destination the predetermined time or more before the arrival deadline when flying along the flight route, the flight-plan generation part 132 does not subtract a certain score from the flight appropriateness stored on the storage unit 12.

The flight-plan generation part 132 determines a threshold density based on the flight appropriateness after addition or subtraction according to all the steps (1) through (9) or a combination of multiple steps. At this time, the flight-plan generation part 132 determines a threshold density to become higher in response to a higher value of flight appropriateness. Owing to addition or subtraction using scores with the flight appropriateness in connection with (1) the flight distance, (2) the weather information, and (7) the existence/nonexistence of other flight devices as well as (5) the maximum wind pressure resistance or the maximum battery capacity in the specification of a flight device among the aforementioned steps (1) through (9), it is possible for the flight-plan generation part 132 to calculate the flight appropriateness in consideration of a crash risk of the flight device 200. In this connection, the flight-plan generation part 132 may calculate the flight appropriateness without considering a crash risk of the flight device 200 by omitting the aforementioned steps.

The flight-plan generation part 132 is configured to comprehensively calculate a crash risk of the flight device 200 according to any one of (1) the flight distance, (4) the weather information, and (7) the existence/nonexistence of other flight devices as well as (5) the maximum wind pressure resistance or the maximum battery capacity in the specification of a flight device, and therefore the flight-plan generation part 132 may change a threshold density to become smaller upon determining that a crash risk of the flight device 200 is higher than a predetermined value. For example, the predetermined value comes from statics regarding crash risks occurring with a plurality of other flight devices flying in the air. The flight-plan generation part 132 determines and transmits a threshold density to the flight device 200.

[Determination of Priority]

Upon generating a flight plan including a plurality of flight routes, the flight-plan generation part 132 may calculate the flight appropriateness for each flight route when the flight device 200 will fly according to each of flight routes included in the flight plan. In this connection, the flight-plan generation part 132 may assign priorities to a plurality of flight routes included in the flight plan based on the calculated flight appropriateness. For example, the flight-plan generation part 132 may assign a higher priority to a flight route having a higher value of flight appropriateness.

[Display of Congested Place]

The display control part 133 reads a congested place registered with the storage unit 26 so as to generate a map image such that a circular image representing the position of the congested area will be superposed on the map image. The display control part 133 generates and displays the map image on a display unit via the communication unit 11. For example, the display unit may be a display screen coupled to the flight management device 100, but it is possible to use a display of another terminal.

FIG. 8 shows an example of a map image. For example, a manager of the flight device 200 using the flight management device 100 starts to execute application software to generate a flight route, which is displayed on the display screen of the flight management device 100. The display control part 133 may display a plurality of circular images C representing a plurality of congested places, which are superposed on the map image. Herein, a series of arrows indicate a flight route generated by the flight-plan generation part 132. The display control part 133 may produce the map display of FIG. 8 in a colored manner such that a section of the flight route passing over avoided objects will be colored in red. In addition, the display control part 133 may display a part of the flight route which is colored in red to indicate the flight position of the flight device 200 when passing over avoided objects.

The storage unit 26 is configured to store images capturing congested places in association with congested places. Upon selecting any one of congested places indicated by circular images C displayed on the display screen, the display control part 133 reads from the storage unit 26 a captured image in association with the selected congested place. The display control part 133 reads and displays the captured image on the display screen. For example, the captured image may be an image which was produced by capturing the congested place in a predetermined period immediate to the current timing.

In addition, the display control part 133 may display on the display screen an image indicating a degree of congestion in the congested place instead of the captured image of the congested place. According to the aforementioned configuration, it is possible for a user of the flight device 200 to easily grasp a degree of congestion in the congested place upon confirming the captured image of the congested place or the image indicating a degree of congestion.

[Procedure of Flight Device 200]

Figure 9:
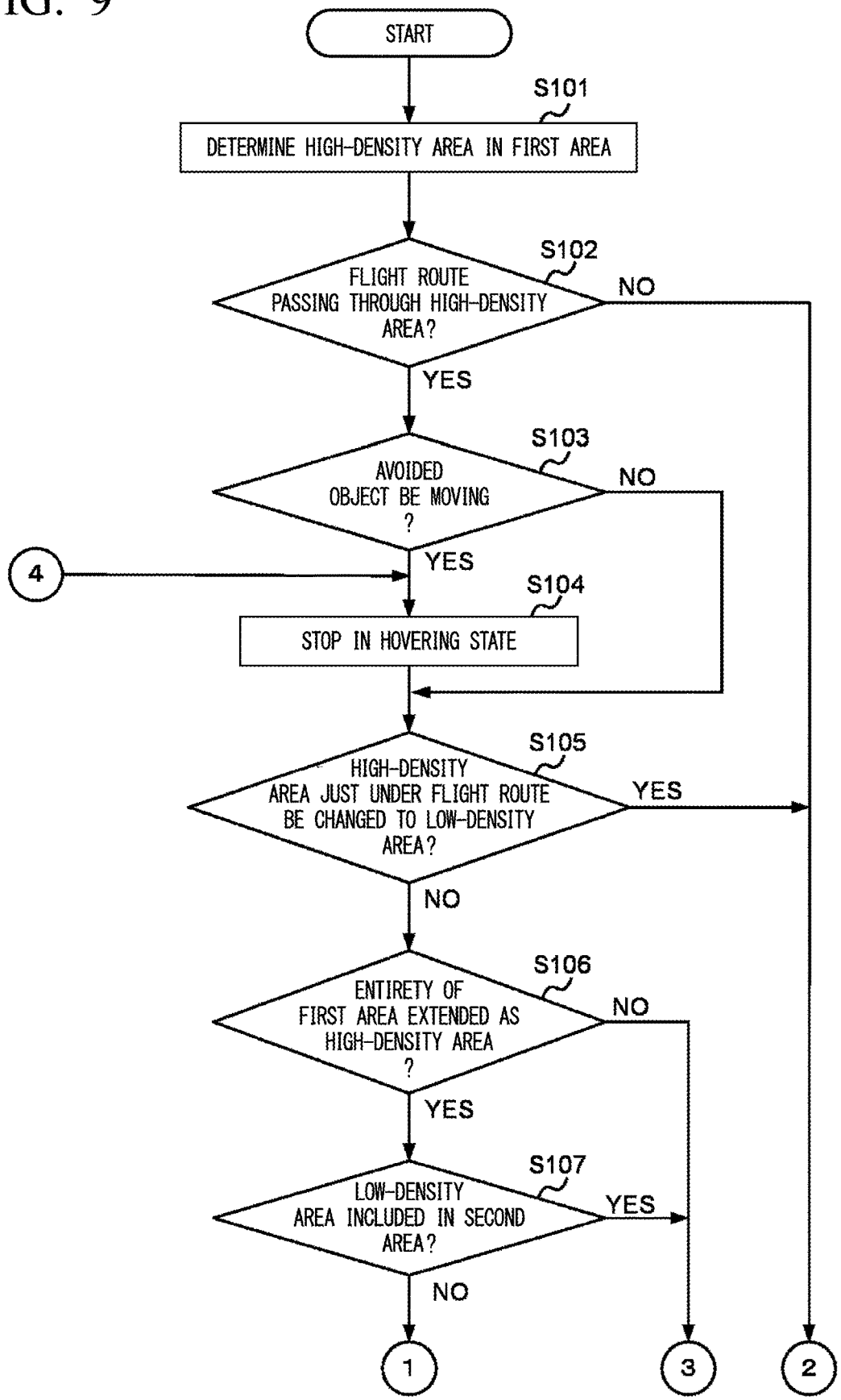
FIG. 9 is a flowchart showing a process to circumvent a high-density area with the flight device of the present embodiment.
Figure 10:
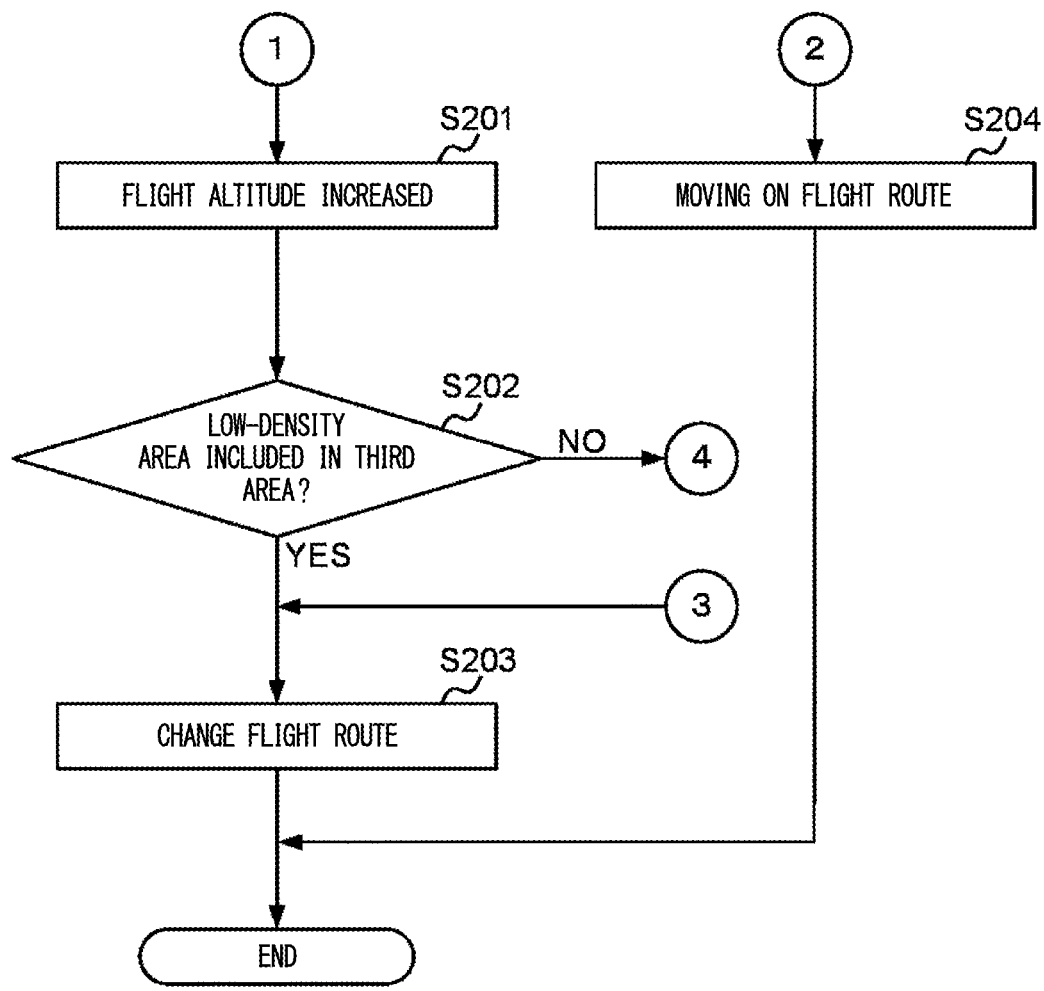
FIG. 10 is a flowchart showing the process to circumvent the high-density area with the flight device of the present embodiment.

FIGS. 9-10 are flowcharts showing a process of circumventing the high-density area R with the flight device 200. The procedure begins when the camera 23 of the flight device 200 during flight is activated to capture the first area H located forward and downward from the position of the flight device 200.

First, the flight control part 273 determines the high-density area R having a density of avoided objects equal to or above a predetermined threshold density in the first area H (S101). The flight control part 273 determines whether or not the flight route according to the flight plan acquired by the acquisition part 271 will pass through the high-density area R (S102). Upon determining that the flight route will pass through the high-density area R, the flight control part 273 determines whether or not any one of avoided objects is moving in the high-density area R (S103). Upon determining that any one of avoided objects is moving in the high-density area R (i.e. YES in S103), the flight control part 273 controls the flight device 200 to stop in a hovering state (S104).

While the flight device 200 stops in a hovering state, the flight control part 273 determines whether or not the high-density area R just below the flight route acquired by the acquisition part 271 will be changed to a low-density area (S105). When the high-density area R just below the flight route acquired by the acquisition part 271 remains after the flight device 200 stops in a hovering state (i.e. NO in S105), the flight control part 273 determines whether or not all the blocks of the first area H can be each regarded as the high-density area R (S106).

Upon determining that all the blocks of the first area H can be each regarded as the high-density area R (i.e. YES in S106), the flight control part 273 changes the directivity of the camera 23 to capture a second area different from the first area H. The flight control part 273 determines the existence/nonexistence of a low-density area having a density of avoided objects less than a predetermined threshold density in the second area (S107). Upon determining the nonexistence of a low-density area in the second area (i.e. NO in S107), the flight control part 273 controls the flight device 200 to ascend in flight altitude (S201) and then changes the directivity of the camera 23 to capture a third area different from the first area H and the second area. The flight control part 273 determines the existence/nonexistence of a low-density area having a density of avoided objects less than the predetermined threshold density in the third area (S202). Upon determining the existence of a low-density area in the third area (i.e. YES in S202), the flight control part 273 changes the flight route to pass through the low-density area (S203), thus exiting the procedure.

According to a determination result of S102 in which the flight control part 273 determines that the flight route does not pass through the high-density area R (i.e. NO in S102), the flight control part 273 does not need to change the flight route so that the flight device 200 will move along the flight route (S204). According to a determination result of S103 in which the flight control pan 273 determines that any one of avoided objects is not moving in the high-density area R (i.e. NO in S103), the process will be returned to the determination of S105.

When the high-density area R just below the flight route acquired by the acquisition part 271 has been changed to a low-density area after the flight device 200 stops in a hovering state (i.e. YES in S105), the flight control part 273 does not need to change the flight route so that the flight device 20 will move along the flight route (S204). According to a determination result of S106 in which the flight control part 273 determines the existence of a low-density area in the first area H (i.e. NO in S106), the flight control part 273 changes the flight route to pass through the low-density area (S203), thus exiting the procedure.

According to a determination result of S107 in which the flight control part 273 determines the existence of a low-density area in the second area (i.e. YES in S107), the flight control part 273 changes the flight route to pass through the low-density area (S203), thus exiting the procedure. According to a determination result of S202 in which the flight control part 273 determines the nonexistence of a low-density area in the third area (i.e. NO in S202), the process will be returned to S104.

To reduce a risk that the flight device 200 may come in contact with avoided objects in a crash or a risk that any objects fallen from the flight device 200 may come in contact with avoided objects, it is possible to consider that the flight device 200 be controlled not to fly over avoided objects. Due to a relatively large number of avoided objects, however, it is difficult for the flight device 200 to circumvent upper spaces above avoided objects. According to the present embodiment, the flight control part 273 may change a flight plan for the flight device 200 flying in the air to circumvent a high-density area having a density of avoided objects equal to or above a threshold density. For this reason, despite a relatively large number of avoided objects, it is possible for the flight control part 273 to reduce a risk that the flight device 200 might come into contact with avoided objects in a crash. Upon determining the nonexistence of a low-density area in the second area, the flight control part 273 may control the flight device 200 to ascend in flight altitude, and therefore it is possible to search for a low-density area with high precision.

Heretofore, the present invention has been described with reference to the foregoing embodiment and examples, however, the technical scope of the present invention should not be necessarily limited to the scope of the foregoing embodiment described above; hence, it is possible to make various modifications and changes within the subject matter of the present invention. For example, it is possible to produce concrete examples regarding the dispersion or integration of devices which should not be limited to the foregoing embodiment, and therefore the entirety or part of devices can be functionally or physically dispersed or integrated in arbitrary units. In addition, it is possible to create a new embodiment using an arbitrary combination of exemplary configurations within the scope of the present invention. In this connection, a new embodiment using an arbitrary combination of exemplary configurations may produce advantageous effects sharing original effects of the foregoing examples.

REFERENCE SIGNS LIST 11 communication unit
12 storage unit
13 control unit
21 communication unit
22 position sensor
23 camera
24 flight mechanism
45 detection part
26 storage unit 27 control unit
100 flight management device
131 registration part
132 flight-plan generation part
133 display control pan
200 flight device
271 acquisition part
272 determination part
273 flight control part
300 base station

The invention claimed is:

1. A flight device comprising a position sensor, a camera, and a processor configured to execute instructions stored on a memory to:
  acquire a flight plan having a flight route for the flight device by radio communication;
  determine a density of avoided objects in a first area corresponding to a scope of the camera configured to view in a forward and downward direction from a current position of the flight device detected by the position sensor; and
  change the flight plan, during a flight along the flight route of the flight plan, to circumvent a high-density area having the density of avoided objects equal to or above a threshold density;
  wherein upon determining that at least one avoided object is moving in the first area, the processor is configured to temporarily stop the flight device in a hovering state without changing the flight route; and
  wherein when the density of avoided objects in the first area is changed to be less than the threshold density while the flight device temporarily stops in a hovering state, the processor is configured to control the flight device to fly over the first area.

2. The flight device according to claim 1, wherein when all blocks in the first area have the density of avoided objects equal to or above the threshold density, the processor is configured to change the flight route to pass through low-density area having the density of avoided objects less than the threshold density in a second area different from the first area.

3. The flight device according to claim 1, wherein when the processor has repeatedly changed the flight plan a predetermined number of times in a predetermined period, the processor is configured to request a flight management device to provide a secondary flight plan different from the flight plan.

4. The flight device according to claim 1, wherein when the flight device is flying at a flight altitude equal to or above a reference value, the processor is configured to decrease the threshold density to be set to the flight device.

5. The flight device according to claim 1, further comprising a detection part configured to detect an obstacle on the flight route, wherein when the processor has changed the flight route to circumvent the obstacle detected by the detection part a predetermined number of times in a predetermined period, the processor is configured to request a flight management device to provide a secondary flight plan having a secondary flight route.

6. A flight management device adapted to a flight device comprising a position sensor and a camera, wherein the flight management device is configured to:
  change a flight plan including a flight route thereof,
  determine a density of avoided objects in a first area corresponding to a scope of the camera configured to view in a forward and downward direction from a current position of the flight device detected by the position sensor, and
  circumvent a high-density area having the density of avoided objects equal to or above a threshold density,
  the flight management device comprising a processor configured to execute instructions stored on a memory to provide the flight device with the flight plan by radio communication, to adjust the threshold density according to the density of avoided objects, and to register the high-density area as a congested place when the flight device has changed the flight plan to circumvent the high-density area a predetermined number of times or more in a predetermined period,
  wherein upon determining that at least one avoided object is moving in the first area, the processor is configured to temporarily stop the flight device in a hovering state without changing the flight route; and
  wherein when the density of avoided objects in the first area is changed to be less than the threshold density while the flight device temporarily stops in a hovering state, the processor is configured to control the flight device to fly over the first area.

7. The flight management device according to claim 6, wherein the processor is configured to generate a flight plan for the flight device to circumvent the congested place according to the threshold density as to whether or not to change the flight route.

8. The flight management device according to claim 6, further comprising a display control part configured to display an image representing the congested place superimposed on a map on a display screen, wherein upon selecting the congested place on the display screen, the display control part is configured to display an image capturing the congested place on the display screen.

9. A flight method adapted to a flight device comprising a position sensor and a camera:
  acquiring a flight plan having a flight route for the flight device by radio communication;
  determining a density of avoided objects in a first area corresponding to a scope of the camera configured to view in a forward and downward direction from a current position of the flight device detected by the position sensor; and
  changing the flight plan during a flight along the flight route of the flight plan to circumvent a high-density area having the density of avoided objects equal to or above a threshold density,
  wherein upon determining that at least one avoided object is moving in the first area, temporarily stopping the flight device in a hovering state without changing the flight route; and
  wherein when the density of avoided objects in the first area is changed to be less than the threshold density while the flight device temporarily stops in a hovering state, controlling the flight device to fly over the first area.

10. A non-transient computer-readable storage medium having a program causing a computer to implement the flight method according to claim 9.

* * * * *